(12) United States Patent
Diel

(10) Patent No.: US 6,929,743 B2
(45) Date of Patent: Aug. 16, 2005

(54) DEVICE AND ASSEMBLY FOR CROSS-FLOW FILTRATION

(75) Inventor: Bernhard Diel, Rosdorf (DE)

(73) Assignee: Sartorius AG, Gottingen (DE)

( * ) Notice: Subject to any disclaimer, the term of this patent is extended or adjusted under 35 U.S.C. 154(b) by 5 days.

(21) Appl. No.: 10/169,493

(22) PCT Filed: Dec. 21, 2000

(86) PCT No.: PCT/EP00/13071

§ 371 (c)(1), (2), (4) Date: Jun. 27, 2002

(87) PCT Pub. No.: WO01/49400

PCT Pub. Date: Jul. 12, 2001

(65) Prior Publication Data

US 2003/0066794 A1 Apr. 10, 2003

(30) Foreign Application Priority Data

Jan. 5, 2000 (DE) .......................................... 100 00 186

(51) Int. Cl.$^7$ ........................ B01D 25/00; B01D 25/164
(52) U.S. Cl. .................. 210/321.64; 210/227; 210/228; 210/231; 210/445; 210/453; 210/650
(58) Field of Search ........................... 210/321.64, 650, 210/227, 228, 231, 445, 453

(56) References Cited

U.S. PATENT DOCUMENTS

| | | | |
|---|---|---|---|
| 3,933,647 A | | 1/1976 | Muller |
| 4,597,868 A | | 7/1986 | Watanabe |
| 4,849,102 A | * | 7/1989 | Latour et al. .......... 210/321.64 |
| 5,015,388 A | * | 5/1991 | Pusineri et al. ............. 210/641 |
| 6,368,505 B1 | | 4/2002 | Grummert et al. |
| 2003/0178358 A1 | | 9/2003 | Osenar et al. |

FOREIGN PATENT DOCUMENTS

| | | |
|---|---|---|
| DE | 34 41 249 A1 | 7/1985 |
| EP | 0 345 209 A2 | 12/1989 |
| EP | 0 498 211 A1 | 8/1992 |
| GB | 2 343 853 | 5/2000 |
| WO | WO 96/28240 | 9/1996 |
| WO | WO 01/85316 | 11/2001 |

OTHER PUBLICATIONS

McGraw Hill Dictionary of Scientific and Technical Terms, Sixth Edition, 2002, p. 339.

* cited by examiner

Primary Examiner—W. L. Walker
Assistant Examiner—Krishnan S Menon
(74) Attorney, Agent, or Firm—Anthony J. Casella; Gerald E. Hespos

(57) ABSTRACT

The invention relates to a device and an assembly for cross-flow filtration comprising filter cassettes. Said filter cassettes are cost-effective to produce as they have few connections and simple clamping plates and are characterized by a long service life and by being highly flexible in adapting their capacity to the desired cross-flow filtration performance. The inventive device (1) comprises a holder and at least one filtration segment (2) consisting of clamping plates with filter cassettes fitted in a sealed manner therebetween. The clamping plates, which are configured as end plates, separation plates, distribution plates and collection plates and the filter cassettes are positioned on the holder so that they can be moved towards one another. The filtration segment consists of two sequences (3, 3') of at least one filter cassette (4, 4'), a distribution plate (5, 5') and at least one additional filter cassette (6, 6'), located between two end plates (7, 7') and interconnected by a common collection plate (8) for the evacuation of the filtrate. The device and assembly are used for treating liquid media in the fields of reverse osmosis, nanofiltration, dialysis, ultrafiltration and microfiltration.

14 Claims, 2 Drawing Sheets

DEVICE AND ASSEMBLY FOR CROSS-FLOW FILTRATION

Figure 1:
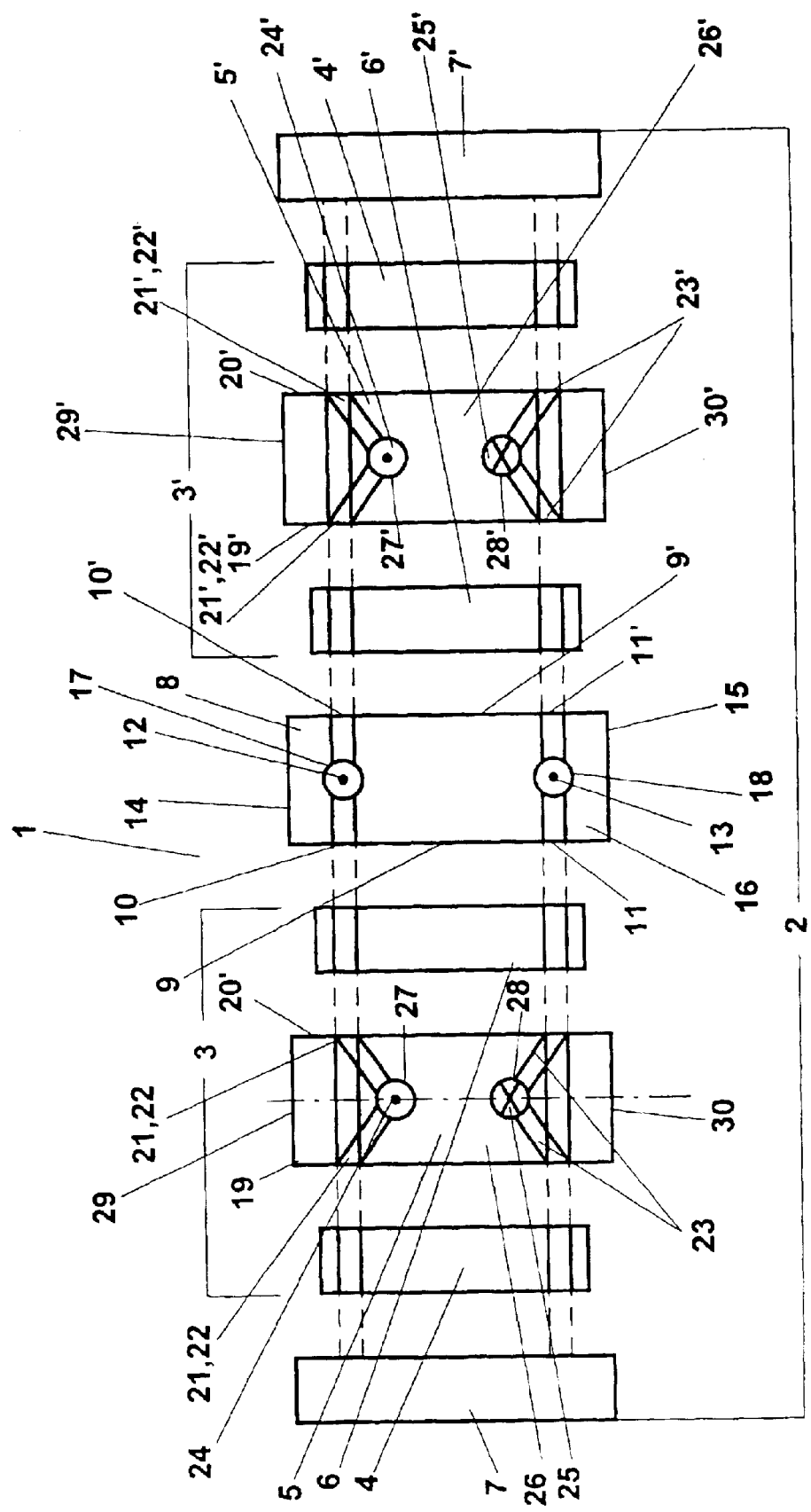

This application is a 371 of PCT/EP00/13071, Dec. 21, 2000, which claims priority over the German Application 100 00 186.6, Jan. 5, 2000.

The invention relates to a device and an arrangement for crossflow filtration which is used for treating liquid media in the fields of reverse osmosis, nanofiltration, dialysis, ultra-filtration and microfiltration.

Devices for crossflow filtration with filter cassettes, in addition to fittings, pumps and auxiliary equipment, generally consist of a holder, filter cassettes and clamping plates. The holder accommodates the clamping plates and at least one filter cassette which is pressed in a sealing manner in between the clamping plates. To this end, the clamping plates are arranged on the holder such as to be movable toward one another. The clamping plates and the filter cassettes have opposite planar front and rear surfaces and also opposite narrow first and second side walls and opposite narrow first and second edge walls. At least one clamping plate is designed as distribution plate having connections for the supply of feed liquid to be filtered into the filter cassettes and for the discharge of concentrate and filtrate from the filter cassettes. If the supply and/or discharge of the fluids is effected merely at one surface of the distribution plate, the term "mondirectional distribution plate" is used, and if the supply and/or discharge of the fluids is effected at the front and rear surface of the distribution plate, the term "bidirectional distribution plate" is used. In the latter case, the filter cassettes are arranged on both sides on the front and rear surface of the distribution plate. Described in DE-A 34 41 249 are filter cassettes and a device for crossflow filtration with the filter cassettes, in which the filter cassettes are clamped between two monodirectional clamping plates. The one is designed as a distribution plate for the supply of feed liquid to be filtered and the discharge of concentrate and the other is designed as a collection plate for the discharge of filtrate with the corresponding connections. U.S. Pat. No. 4,715,955 describes a device consisting of holder, filter cassette and clamping plates, one of the clamping plates being designed as a monodirectional distribution plate and all the connections for the supply and discharge of the fluids being arranged thereon. A configuration of this distribution plate as a bidirectional distribution plate is proposed in EP 0 345 209 B1. A disadvantage with all of these devices is that the crossflow filtration capacity of such devices is limited by the number of filter cassettes which can be arranged between the distribution and collection plates. Depending on the cassette construction and pump capacity of the crossflow device or arrangement, the number of filter cassettes is between one and 7 to 10. With a larger number of filter cassettes, an inflow-side pressure loss leads to an uneven flow over the diaphragm surfaces and thus to uneven utilization of the diaphragm surfaces of the filter cassettes, which results in premature blocking of the diaphragms and a reduction in the crossflow filtration performance.

Those surfaces of the distribution plates and collection plates which face the filter cassettes have spaced-apart openings which correspond with corresponding openings of the filter cassettes to be connected to the plate. In the filter cassettes, as a rule, the openings for the supply of feed liquid to be filtered and a first proportion of the openings for the discharge of filtrate lie on a straight line running parallel to the first narrow edge wall, and the openings for the discharge of concentrate and a second proportion of the openings for the discharge of filtrate lie on a straight line running parallel to the second narrow edge wall. Those openings of the distribution and collection plates which are assigned to the openings of the filter cassette open into a corresponding passage which runs parallel to one of the narrow edge walls and to the front and rear surface of the plate. The respective passage emerges from the distribution and collection plate on at least one of the side walls. According to U.S. Pat. Nos. 4,715,955 and EP 0 345 209 B1, either the openings for the discharge of filtrate or the openings for the supply of the feed liquid and the discharge of concentrate open into the corresponding passage at an acute angle relative to the front surface or respectively the front and the rear surface. According to EP 0 498 211 B1, the openings for the discharge of filtrate are connected to a centrally arranged passage via filtrate line sections located on the front surface of the distribution plate.

Further disadvantages of the devices of the prior art consist in the fact that there are a large number of connections on the clamping plates, which involves high costs and constitutes a source of leakage and contamination. In this case, it is especially disadvantageous if the number of connections is high on the filtrate side (clean side) of all sides.

In addition, distribution plates with all the connections in one plate have the disadvantage of a high production cost, since the bores, passages and filtrate line sections have to be accommodated in a confined space. On account of the small space on the narrow side walls, the passage connections often have to be installed on both opposite side walls, which restricts the accessibility of the connections and the possible installation of the device in confined spaces. According to WO 96/28240, the passage for the supply of the feed liquid is provided on the rear surface of the distribution plate, as a result of which the device is restricted in its variability, for this plate must inevitably be installed as a monodirectional distribution end plate.

The object of the invention is to propose a device and arrangement for crossflow filtration with filter cassettes, which can be produced in a cost-effective manner on account of a small number of connections and simple clamping plates and is distinguished by high variability with regard to the capacity adaptation to the required crossflow filtration performance and by a long service life.

The object is achieved by the subject matter of the claims and advantageous developments of the invention are defined by the features of the subclaims.

The device according to the invention for crossflow filtration comprises a holder and at least one filtration segment consisting of clamping plates and filter cassettes pressed in between in a sealing manner, the clamping plates, which are designed as end plates, as separation plates, as distribution plates and as collection plates, and the filter cassettes being arranged on the holder such as to be movable toward one another. The filtration segment comprises two sequences of at least one filter cassette, a distribution plate and at least one further filter cassette, which are arranged between two end plates and are connected to one another by a common collection plate for the discharge of filtrate. As a rule, the at least one filter cassette forms a module block which consists of two to about 10 filter cassettes, preferably 4 to 5 filter cassettes.

Due to the construction of the filtration segment, only one collection plate common to each filtration segment is required, via which collection plate the filtrate is discharged from the two sequences of at least one filter cassette, a distribution plate and at least one further filter cassette. As a result, for four filter cassettes or four module blocks, only two filtrate connections are required, instead of at least four filtrate connections according to the prior art. In addition, the construction of the filtration segments makes possible a modular extension of the device with a multiplicity of filtration segments, the number of which is limited merely for reasons of practicability. Thus the device, in conformity with the respective filtration requirements, can be adapted in a variable manner to the required filtration capacity. The sequence of at least one filter cassette (one module block), a distribution plate and at least one further filter cassette (one further module block) in the filtration segment ensures that each filter cassette adjacent to the distribution plate or each module block adjacent to the distribution plate is subject to flow in a similar manner without additional measures being necessary for this purpose. If four filter cassettes or four module blocks are used, the additional use of a separation plate between the centrally situated adjacent filter cassettes or module blocks would be necessary for this purpose in a device according to the prior art.

In a preferred embodiment of the invention, where the filter cassettes and the clamping plates designed as end plates, as separation plates, as distribution plates and as collection plates have opposite, planar front and rear surfaces, opposite narrow side walls and opposite narrow edge walls, the distribution plates for the supply of feed liquid and for the discharge of concentrate have at the front and rear surfaces spaced-apart openings which correspond with all the openings of the filter cassettes, the openings for the supply of feed liquid and for the discharge of concentrate, while emerging on at least one of the side walls provided with connections, opening in each case into passages running parallel to the front and rear surfaces and to the edge walls and intended for the supply of feed liquid and for the discharge of concentrate. On the other hand, the openings for filtrate extend from the front to the rear surface and parallel to the edge walls. The collection plates for the discharge of filtrate have at the front and rear surfaces merely spaced-apart openings which correspond with the corresponding openings of the filter cassettes for filtrate. The openings open in each case into passages running parallel to the front and rear surfaces and to the edge walls and intended for the discharge of filtrate, these passages emerging on at least one of the side walls provided with connections. Due to the omission of the passages for the discharge of filtrate in the distribution plates and the limiting of the openings in the collection plates to those for filtrate, such clamping plates can be produced in a cost-effective manner.

In a further embodiment of the invention, adjacent filtration segments are separated from one another by a single end plate acting as separation plate. Such separation plates, like the end plates, have no openings or passages at all and can therefore be produced in a cost-effective manner.

The design according to the invention of the distribution and collection plates, in a further advantageous embodiment, enables all the connections for the passages to be provided on one of the side walls. This is especially important for a space-saving installation of the devices according to the invention in small spaces, where they can be set up directly next to a wall, since access to the device is only necessary from one side.

With the exception of the planar front and rear surfaces, the clamping plates may have an external contour differing from the filter cassettes. Thus they may have, for example, a polygonal, circular or oval shape. In such embodiments, opposite narrow side and edge walls refer to those which would be obtained by projection of the corresponding side and edge walls of the filter cassettes onto the clamping plates.

On devices which are composed of a filtration segment, fixed tubing of the clean side (filtrate collection plate with the line for the discharge of filtrate) may preferably be effected, which is especially important for the pharmaceutical sector.

The arrangement according to the invention for crossflow filtration with filter cassettes comprises at least two devices of the above-mentioned type, which are connected to one another via common lines for the supply of feed liquid, for the discharge of concentrate and for the discharge of filtrate. A preferred embodiment in which all the outlets on the distribution and collection plates lie on one side wall is space-saving and cost-saving.

Filtration, cleaning, flushing and sterilization of the devices and the arrangements is operated in a computer-controlled manner, for which purpose the connections at the distribution and collection plates and the lines are equipped with flow meters and/or pressure sensors and also controllable valves which are familiar to the person skilled in the art, and cleaning, flushing and sterilization media can be supplied and discharged via the lines. It is especially advantageous that individual devices or individual filtration segments can be shut off or can be separately subjected to said operations, in the course of which the other devices or filtration segments of the arrangement or device remain in filtration operation.

The invention will now be explained in more detail with reference to FIGS. 1 and 2.

Figure 2:
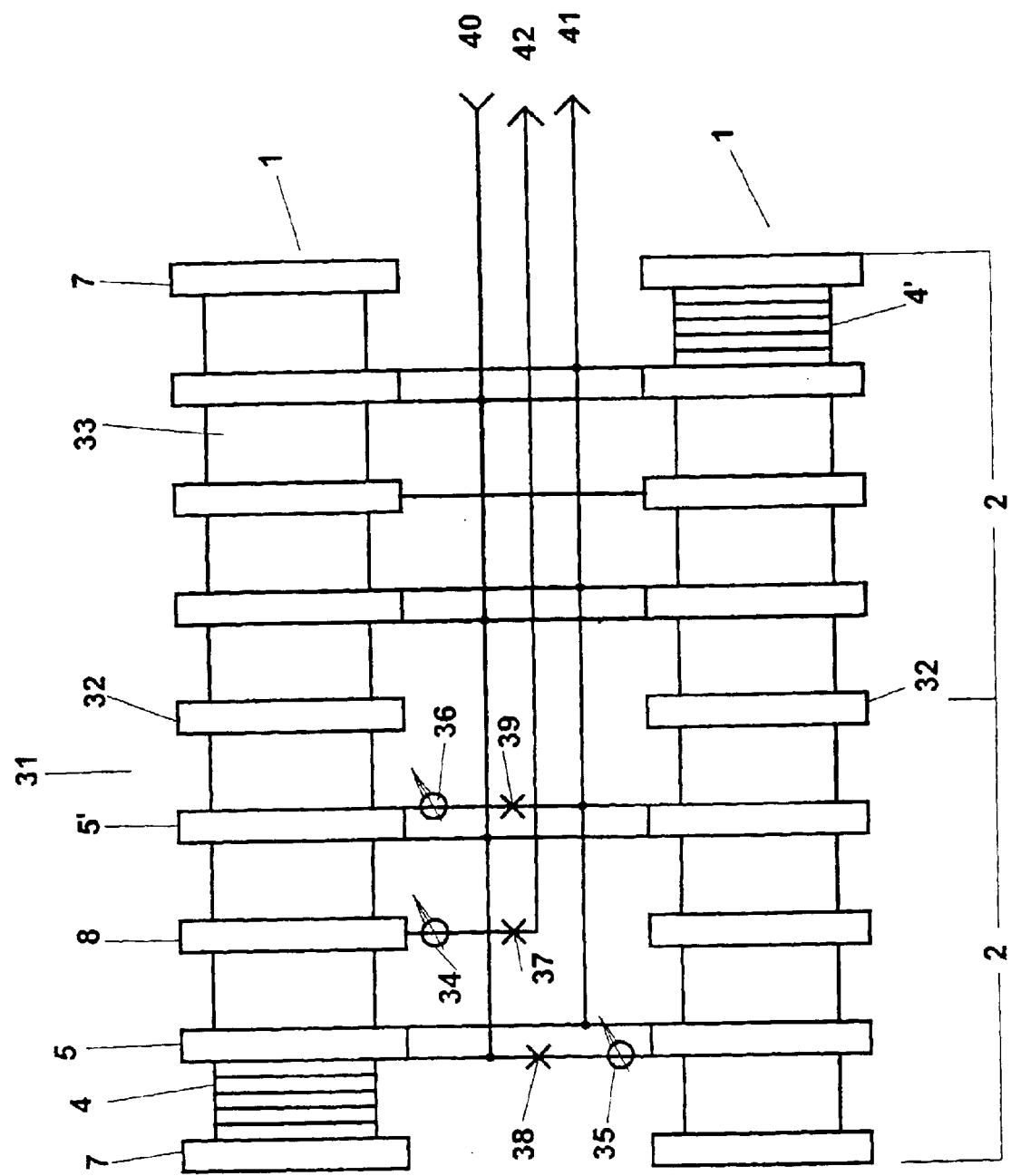

In the drawing:

FIG. 1 shows a schematic exploded representation of a filtration segment of a device according to the invention, and FIG. 2 shows a schematic representation of an embodiment of an arrangement according to the invention.

According to FIG. 1, the device 1 for crossflow filtration comprises a filtration segment 2 which is arranged on a holder (not shown). Structures for holding the discrete elements of a filtration device are well known in the art. Examples of a typical holder for a filtration device are shown as reference numeral 16 in FIG. 1 of U.S. Pat. No. 4,715,955 or reference numeral 11 in FIG. 1 of EP 0 345 209. The filtration segment 2 is formed by two sequences 3, 3' consisting of a filter cassette 4, 4', a distribution plate 5, 5' and a further filter cassette 6, 6', which are arranged between two end plates 7, 7' and are connected to one another by a common collection plate 8. The collection plate 8 serves to discharge filtrate and, at its front surface 9 and rear surface 9', has spaced-apart openings 10, 10' and spaced-apart openings 11, 11' which correspond with the corresponding openings for filtrate from the filter cassettes 4, 4', 6, 6'. They open into passages 12, 13 for the discharge of the filtrate, these passages 12, 13 running parallel to the front surface 9 and rear surface 9' and to the edge walls 14, 15. The passages 12, 13 emerge on the side wall 16, where they are provided with connections 17, 18. The distribution plates 5, 5' serve to supply feed liquid and to discharge concentrate and, at the front surfaces 19, 19' and rear surfaces 20, 20', have spaced-apart openings for filtrate 21, 21', for the supply of the feed liquid 22, 22' and for the discharge of concentrate 23, 23', these openings corresponding with all the openings of the filter cassettes. The openings 22, 22' open at an acute angle into passages for the supply of feed liquid 24, 24' and the openings 23, 23' open at an acute angle into passages for the discharge of concentrate 25, 25', or vice versa if the feed is reversed, these passages emerging on the side wall 26, 26', where they are provided with connections 27, 27', 28, 28'. The passages 24, 24' and 25, 25' run parallel to the front surfaces 19, 19' and rear surfaces 20, 20' and also to the edge walls 29, 29', 30, 30' of the distribution plates 5, 5'. The openings for filtrate 21, 21' extend from the front surface 19, 19' to the rear surface 20, 20' and parallel to the edge walls 29, 29', 30, 30'.

The arrangement 31 shown in FIG. 2 comprises two devices 1 for crossflow filtration, which each consist of two filtration segments 2 separated by separation plates 32. Module blocks 33 consisting of 5 filter cassettes 4, 4' each are pressed in a sealing manner in between the clamping plates 7, 5, 8, 5', 32. The connections for the discharge of filtrate 17, 18 (FIG. 1), the connections for the discharge of concentrate 28, 28' (FIG. 1) and the connections for the supply of feed liquid 27, 27' (FIG. 1), but at least the common lines, are equipped with pressure gages or flow meters 34, 35, 36 and valves 37, 38, 39 and are in each case connected to one another via common lines for the supply of feed liquid 40, for the discharge of concentrate 41 and for the discharge of filtrate 42.

To carry out the filtration, the feed liquid to be filtered is pumped under pressure via the line 40 by means of the valves 38, the connections 27, 27' (FIG. 1) and the distribution plates 5, 5' into the module blocks 33, where it flows over the diaphragms of the filter cassettes 4, 4' and is discharged as concentrate via the connections 28, 28' (FIG. 1), valves 39 and the common line 41. The portion permeating through the diaphragms is discharged as filtrate via the connections 17, 18 (FIG. 1), the valves 37 and the common line 42.

| List of reference numerals | |
|---|---|
| 1 | Device for crossflow filtration |
| 2 | Filtration segment |
| 3, 3' | Sequences |
| 4, 4' | Filter cassette |
| 5, 5' | Distribution plate |
| 6, 6' | Further filter cassette |
| 7, 7' | End plates |
| 8 | Common collection plate |
| 9, 9' | Front and rear surfaces |
| 10, 10', 11, 11' | Spaced-apart openings |
| 4, 4', 6, 6' | Openings for filtrate of the filter cassettes |
| 12, 13 | Passages for the discharge of the filtrate |
| 14, 15 | Edge walls |
| 16 | Side wall |
| 17, 18 | Connections for the discharge of filtrate |
| 19, 19' | Front surfaces of the distribution plate |
| 20, 20' | Rear surfaces of the distribution plate |
| 21, 21' | Openings for filtrate |
| 22, 22' | Openings for the supply of the feed liquid |
| 23, 23' | Openings for the discharge of concentrate |
| 24, 24' | Passages for the supply of feed liquid |
| 25, 25' | Passages for the discharge of concentrate |
| 26, 26' | Side wall |
| 27, 27' | Connections for the supply of feed liquid |
| 28, 28' | Connections for the discharge of concentrate |
| 29, 29', 30, 30' | Edge walls of the distribution plates 5, 5' |
| 31 | Arrangement |
| 32 | Separation plate |
| 33 | Module blocks |
| 34, 35, 36 | Pressure gage or flow meter |
| 37, 38, 39 | Valves |
| 40 | Line for the supply of feed liquid |
| 41 | Line for the discharge of concentrate |
| 42 | Line for the discharge of filtrate |

What is claimed is:

1. A device for cross flow filtration comprising:
a holder;
a plurality of clamping plates including end plates, separation plates, separate distribution plates, and separate collection plates, said clamping plates arranged on said holder so as to be moveable towards one another; and
at least one filtration segment, each said filtration segment having first and second sequences, each said sequence having a distribution plate, first and second cross flow filter cassettes disposed adjacent to and on opposing sides of said distribution plate, said first and second cross flow filter cassettes arranged on the holder so as to be movable towards one another, an end plate adjacent the side of said second cross flow filter cassette opposite said distribution plate, said first and second sequences disposed on opposing sides of the collection plate, said collection plate adjacent to said first cross flow filter cassettes and in fluid communication with each said first cross flow filter cassette for the discharge of filtrate, wherein said first cross flow filter cassettes is pressed in between said collection plate, and said distribution plate and said second cross flow filter cassette is pressed between said distribution plate and said end plate in a sealing manner.

2. The device of claim 1, wherein:
said cross flow filter cassettes and clamping plates having opposing front and rear planar surfaces, opposing narrow side walls and opposing narrow edge walls
said cross flow filter cassettes further having a plurality of openings for filtrate;
said distribution plates further having spaced-apart openings on the front and rear surfaces that correspond with the openings of the cross flow filter cassettes, a first connection for the supply of feed liquid and a second connection for the discharge of concentrate, said first and second connections disposed on at least one same side wall and opening into passages, said passages disposed parallel to the front and rear surfaces and parallel to the edge walls, and an opening for filtrate extends from said front surface to said rear surface and is parallel to said edge walls;
and said collection plate having spaced-apart openings on the front and rear surfaces that correspond to the openings of said first cross flow filter cassettes, and first and second connections on at least one of said sidewalls in fluid communication with passages that run parallel to the front surface, parallel to the rear surface and parallel to the edge walls for the discharge of filtrate.

3. The device of claim 1, wherein adjacent filtration segments are separated from one another by an end plate acting as a separation plate.

4. The device of claim 2, wherein adjacent filtration segments are separated from one another by an end plate acting as a separation plate.

5. The device of claim 2, wherein all the connections for the passages are provided on one of the sidewalls.

6. The device of claim 3, wherein all the connections for the passages are provided on one of the sidewalls.

7. The device of claim 4, wherein all the connections for the passages are provided on one of the sidewalls.

8. The device of claim 1, wherein at least two filtration segments are provided, said filtration segments are in fluid communication with each other via common lines for the supply of feed liquid, for the discharge of concentrate and for the discharge of filtrate.

9. The device of claim 2, wherein at least two filtration segments are provided, said filtration segments are in fluid communication with each other via common lines for the supply of feed liquid, for the discharge of concentrate and for the discharge of filtrate.

10. The device of claim 3, wherein at least two filtration segments are provided, said filtration segments are in fluid communication with each other via common lines for the supply of feed liquid, for the discharge of concentrate and for the discharge of filtrate.

11. The device of claim 4, wherein at least two filtration segments are provided, said filtration segments are in fluid communication with each other via common lines for the supply of feed liquid, for the discharge of concentrate and for the discharge of filtrate.

12. The device of claim 5, wherein at least two filtration segments are provided, said filtration segments are in fluid communication with each other via common lines for the supply of feed liquid, for the discharge of concentrate and for the discharge of filtrate.

13. The device of claim 6, wherein at least two filtration segments are provided, said filtration segments are in fluid communication with each other via common lines for the supply of feed liquid, for the discharge of concentrate and for the discharge of filtrate.

14. The device of claim 7, wherein at least two filtration segments are provided, said filtration segments are in fluid communication with each other via common lines for the supply of feed liquid, for the discharge of concentrate and for the discharge of filtrate.

* * * * *